May 5, 1970          K. A. WHEELER          3,509,946
FOLDING IMPLEMENT GANG
Filed Sept. 26, 1967          2 Sheets-Sheet 1
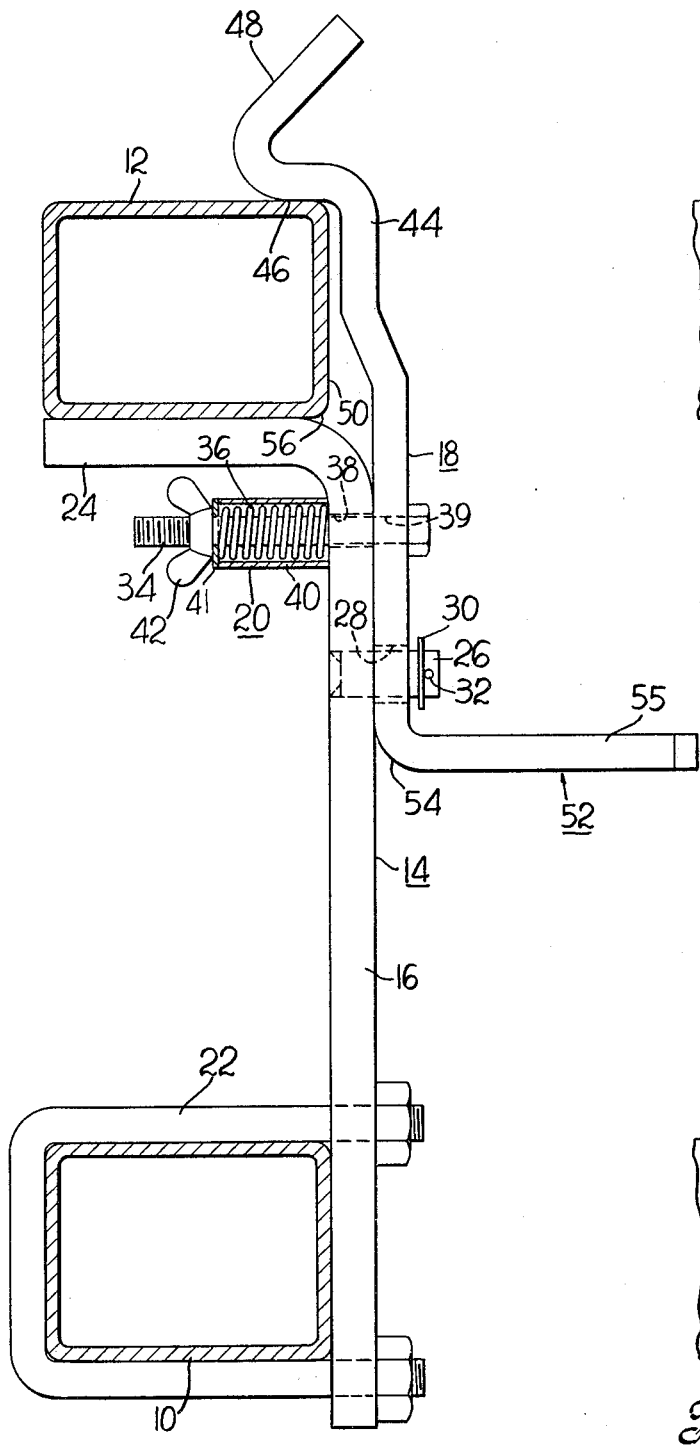
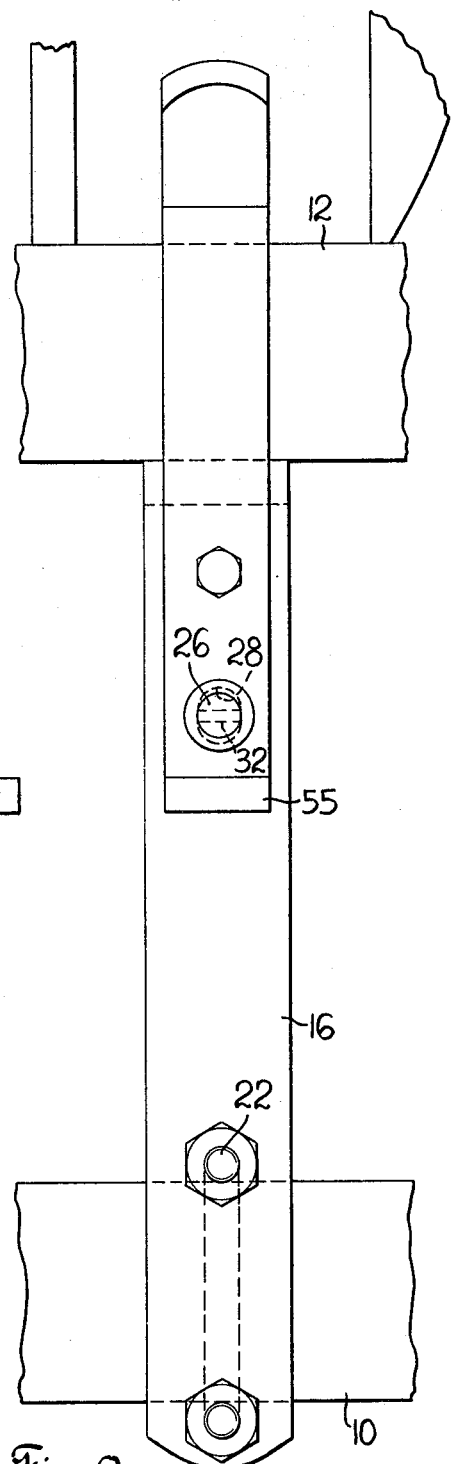

United States Patent Office 3,509,946
Patented May 5, 1970

3,509,946
FOLDING IMPLEMENT GANG
Keith A. Wheeler, West Allis, Wis., assignor to Allis Chalmers, Milwaukee, Wis.
Filed Sept. 26, 1967, Ser. No. 670,700
Int. Cl. A01b *21/08, 33/16, 35/28*
U.S. Cl. 172—570     3 Claims

ABSTRACT OF THE DISCLOSURE

An improved transport latch for foldup implement gangs which is self-actuating and can be positively locked.

---

This invention relates generally to agricultural implements and more particularly to improvements in foldable disk harrow extension gangs.

One of the problems in folding gangs of this type has been the latch means employed to hold the folded gangs in their transport position. The prior art latches have been difficult to operate and/or they did not provide the necessary positive locking action. When the harrow extension is in its folded transport position, it is desirable that the foldup gangs be easily and securely locked in this position to prevent accidental opening up of the gang when the harrow is being transported or worked in its folded condition. Accidental opening up of the gang could be very dangerous to humans and to other vehicles during highway travel and could also result in serious injury or damage if it should open and contact a person or obstruction such as a fence or building while being transported. The foldable gang extension is relatively heavy and carries a series of sharp blades so in the interest of safety to the operator, the hold down latch should be automatic so that he can concentrate on the folding of the gang and not be distracted by being forced to operate a manually actuated latch.

An object of this invention is to provide an improved latch for a disk harrow foldup gang and which latch is actuated automatically by the folding action of the gang to its folded transport position.

A further object of this invention is to provide a positively actuated latch which can be locked in holding position against accidental opening.

A further object of this invention is to provide a relatively inexpensive latch means for a foldup disk gang for retaining an extension gang in folded position.

These and other objects and advantages of the present invention will be apparent to those skilled in the art after a consideration of the following detailed description, taken in conjunction with the accompanying drawings in which:

FIG. 1 is a section view taken on line I—I of FIG. 3;

FIG. 2 is a rear view of the latch assembly shown in FIG. 1;

Figure 3:
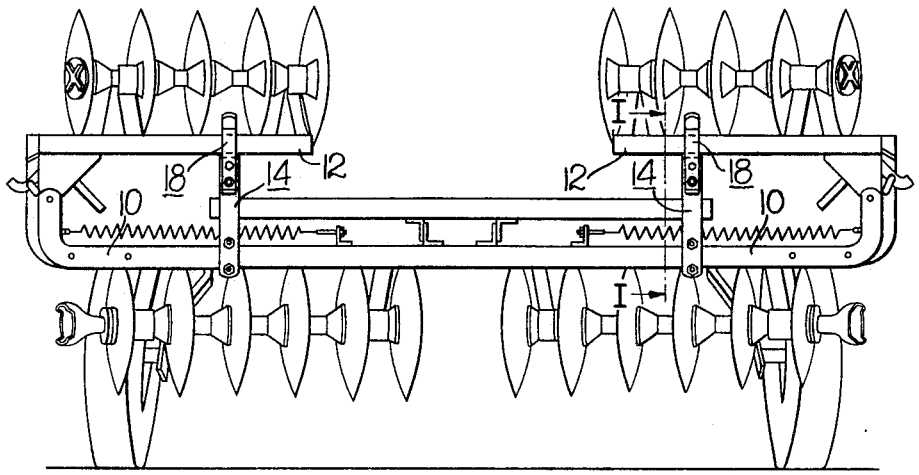
FIG. 3 is a rear elevation view of a disk gang harrow with the extension gangs thereof shown in transport position.
Figure 4:
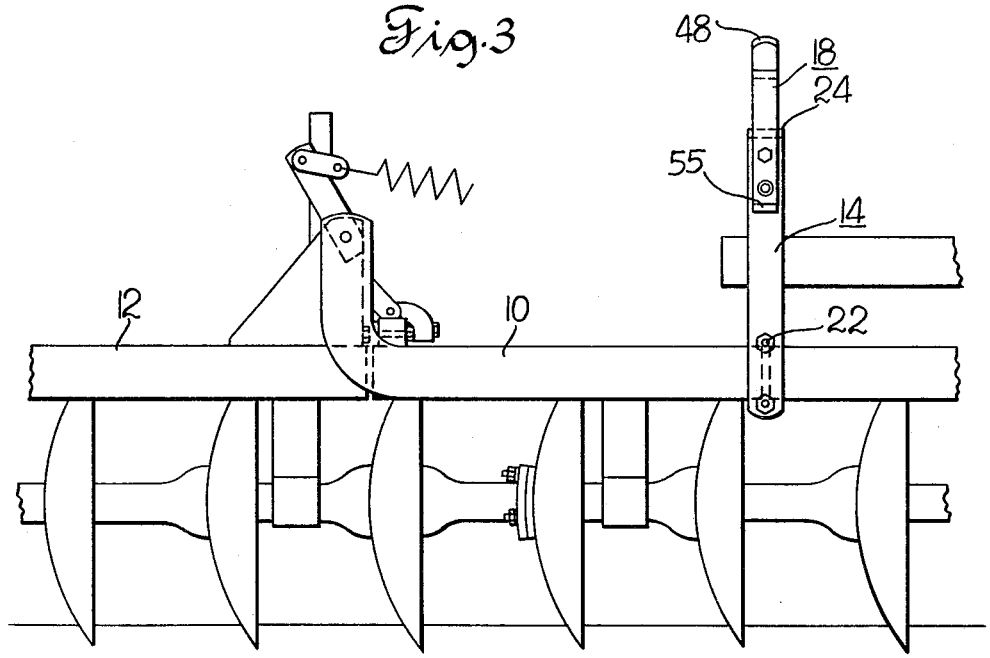
FIG. 4 is an enlarged partial view similar to FIG. 3 with one of the extension gangs shown in extended or working position.

Referring now to FIGS. 1 and 3, the present invention is a hold down device used in connection with a foldup disk harrow gang in which reference numeral 10 indicates the main or stationary disk gang tube and numeral 12 refers to the foldable extension disk gang tube. It should be understood that the extension gang and its operation is similar to that shown and described in the patent to M. E. Walberg, U.S. 2,974,738, issued Mar. 14, 1961, and that the present hold down device is an improvement over the structure shown in FIG. 6 of the aforesaid Walberg patent. In view of the foregoing, it is believed a detailed description of the disk gang structure and function can be eliminated and a description of the present hold down device will be sufficient because if greater details of the disk harrow implement are desired, reference can be had to the aforementioned patent.

The subject hold down device, generally indicated by numeral 14 includes a vertically extending stand or bracket 16, a latch member 18 and a spring bias means 20. The bracket 16 is attached to tube 10 by means of U-bolt 22 and extends vertically above the tube 10 and has a portion of its upper end bent horizontally to form a seat or support 24 for the extension gang tube 12 when it is in its folded transport position. It is to be noted that when extension gang tube 12 is in its folded position, the two tubes 10 and 12 are in vertical alignment and are parallel.

A formed latch member 18 is mounted on the side of the bracket 16 by means of a pin 26 which is rigidly secured, as by welding, to said support and loosely received by a slotted opening 28 in latch member 18. The latch member 18 is retained on the pin 26 by means of a plate washer 30 and a cotter pin 32 which are spaced from the latch member 18 to permit relative movement between the latch 18 and pin 26.

The latch member 18 is resiliently urged toward the support 16 and the extension gang tube 12 seated thereon by a spring bias means generally indicated at 20. This bias means 20 is comprised of a bolt 34 and a compression spring 36. The bolt 34 is received by aligned openings 38 in the support 16, and 39 in latch member 18 with such openings being vertically spaced above the pin connection 26. The bolt 34 extends through the openings 38 and 39 and mounts a compression spring 36 thereabout which is adjustably retained thereon by a spacer 40 surrounding the spring 36 and bolt 34 and by a washer 41 and wing nut 42.

The upper portion 44 of the latch member is bent so as to provide a locking surface 46 and a cam surface 48. The locking surface 46 overlies and engages the upper surface of the extension gang tube 12 when folded. The cam surface 48 extends upwardly at an angle so as to project over the locking surface 46 and beyond a plane vertically aligned with the inner surface 50 of the extension gang tube 12. The lower portion 52 of the latch member 18 is bent on a radius 54 outwardly 90° from the support to form an operating handle or lever 55 by which the latch 18 can be manually actuated to release the extension tube 12.

The operation of the hold down latch is as follows: To engage the latch, the extension gang is pivoted over onto the main harrow frame until the inner surface 56 of the gang tube 12 contacts the cam surface 48 of the latch member 18. Continued pivotal movement and the exertion of a downward force on the extension gang will cause the latch member 18 to pivot outwardly away from the support 16 with the radius portion 54 forming the fulcrum about which the latch member pivots. This movement of the latch member 18 will compress spring 36 and cause the latch member to assume an angular relation with respect to pin 26. When the gang tube 12 contacts the support seat 24 and the locking surface 46 of the latch member is in horizontal alignment with the upper face of the tube 12, the spring 36 will automatically return the latch member to its original position with the locking surface 46 of the latch engaging the gang tube to securely hold the extension gang in its folded transport position. If it is desired to positively lock the extension gang in this secured position, same can be accomplished by turning wing nut 42 down hard against washer 41 and spacer 40 which now prevents the latch from being moved away from gang tube 12.

To disengage the latch, loosen wing nut 42 until the nut is approximately one-half inch from the end of spring spacer 40. Pressure is then exerted on the lever portion 55 of the latch member 18 thereby pivoting the latch away from the support 16, against the compressive resistance of spring 36. This movement will disengage the latch locking surface 46 from the gang tube 12 and permit pivoting of the extension gang into its extended operating position.

From the foregoing it is believed that an improved hold down latch for a foldup disk harrow gang has been provided that is simple and practical in construction, strong and reliable in use, efficient and durable in operation, small and compact as to size, inexpensive to manufacture and otherwise well adapted for the purposes for which it is intended.

The foregoing disclosure relates to only a preferred embodiment of the invention and numerous modifications or alterations may be made therein without departing from the spirit or scope of the invention as defined in the appended claims.

The embodiments of the invention in which an exclusive property or privilege is claimed are defined as follows:

1. A locking device for a folding gang implement having at least one main gang section and an extension gang pivotally mounted on said main gaing section for swinging movement from an extended to a folded position comprising, a bracket secured to said main gang section, said bracket having one portion extending vertically along one side of said main gang section and a laterally extending portion, said laterally extending portion overlying said main gang section to provide a support for said extension gang when in folded position, a latch member pivotally attached to said one portion and having an upper part spaced from said laterally extending portion and normally overlying same, and biasing means for maintaining said upper part in said overlying relation and thereby retaining said extension gang between said laterally extending portion and said upper part, and wherein said latch member has a top portion extending upwardly at an angle away from said main gang forming a cam for moving said latch out of said overlying relation responsive to said extension gang being moved to folded position, and said biasing means then returning said top portion to a position overlying said extension for retaining same in said folded position.

2. A locking device as recited in claim 1 and wherein said latch member has a laterally extending bottom portion forming an operating handle for said latch member so that a downward movement of said handle pivots the upper end of said latch out of contact with said extension gang when in folded position thereby permitting movement in said extension to extended position.

3. A locking device as recited in claim 1 and wherein securing means is carried by said one portion for preventing pivotal movement of said latch member.

References Cited
UNITED STATES PATENTS

| | | | |
|---|---|---|---|
| 1,308,938 | 7/1919 | Donovan | 287—99 |
| 2,064,839 | 12/1936 | Kroll et al. | 16—145 X |
| 2,107,095 | 2/1938 | Wagner | 287—99 X |
| 2,974,738 | 3/1961 | Walberg | 172—568 |
| 3,362,484 | 1/1968 | Walberg | 172—568 |

FOREIGN PATENTS 694,897   7/1953   Great Britain.

ROBERT E. PULFREY, Primary Examiner

A. E. KOPECKI, Assistant Examiner

U.S. Cl. X.R.

16—145; 172—568; 287—99